United States Patent Office 3,313,725
Patented Apr. 11, 1967

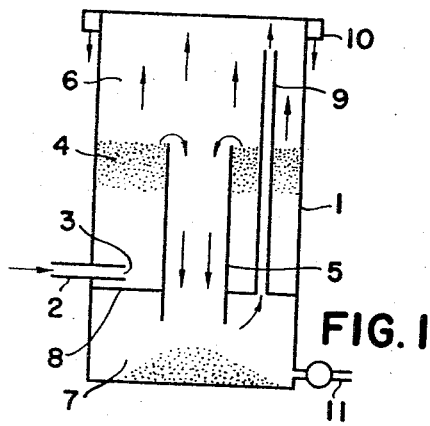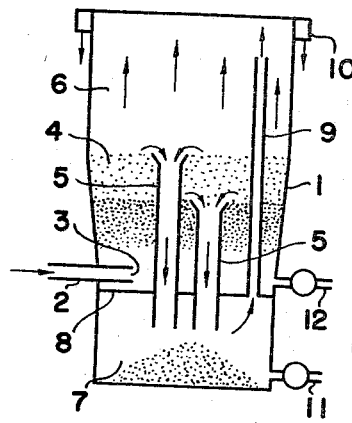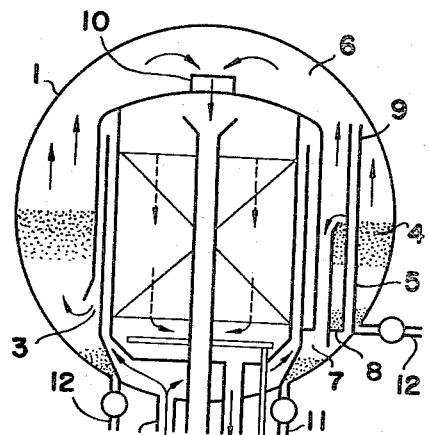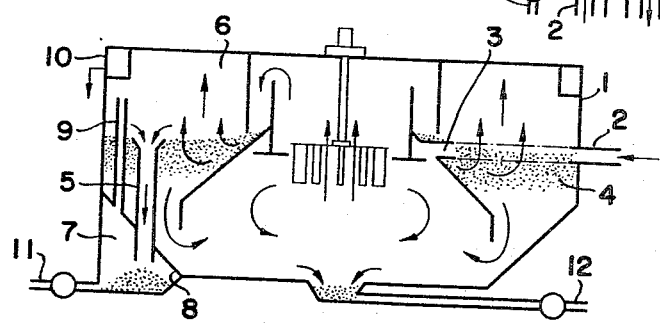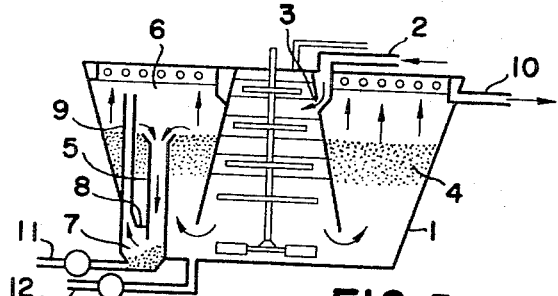

3,313,725
APPARATUS AND METHOD FOR CLARIFYING WATER
Koh Tsuda and Takemasa Yasukawa, Tokyo, and Tadao Imamura, Yokohama-shi, Japan, and Itsuro Nagahama, Berkeley, Calif., assignors to Chiyoda Kako Kensetsu Kabushiki Kaisha, Tokyo, Japan
Filed May 4, 1964, Ser. No. 364,726
Claims priority, application Japan, Feb. 3, 1964, 39/5,237
2 Claims. (Cl. 210—20)

The present invention relates to a water clarifying apparatus, and more particularly, to an apparatus for clarifying water comprising a fluidizing separator and a concentrator so as to carry out water clarification in two or more steps; and a method for clarifying water by using the above-mentioned apparatus.

An object of the present invention is to provide a water clarifying apparatus of high efficiency in which clarified water is readily separated from flocs formed by addition of some chemicals (including inorganic salts, high molecule compounds, etc.) in two or more steps and highly concentrated sludge is formed even under high upward velocity of water. In this case, the term "floc" is understood to mean a floating matter in water having no particular shape consisting of dirts, impurities or the like collected around a metallic hydroxide particle such as aluminum hydroxide and the like.

Another object of this invention is to provide a highly efficient method for clarifying water wherein flocs contained in raw water are coagulated and separated therefrom initially in a fluidized upward flow within a fluidizing separator and then in a concentrator compartment by settling.

The conventional upward flow type clarifiers of the kind generally in use are equipped with a sludge concentrator in the bottom or corner of the separating zone, in which only flocs having settling velocities greater than the upward velocity or circulating flow velocity will settle by gravity by using a concentrator which is widely open towards the separating zone. Thus, the conventional upward flow type separator will have difficulties in separating flocs that tend to settle in a concentrator, because they are hampered by the upward and circulating flow, and particularly by the upward flow of water replaced by flocs settling into a concentrator. The sludge concentrates and becomes more dense, as it settles deeper into a concentrator, without facilitating floc settlement by density difference, resulting in no increase of settled flocs in that area. Hence, settling will take place by gravity alone. As a result, the upward velocity of clarified water is increased for the sole purpose of increasing the processing capacity, a high upward flow velocity cannot be maintained due to a carryover of flocs. Thus only a low velocity at most in a range of three to five meters per hour has been found possible, and an increase of processing capacity was thus not attained. In the present invention, those disadvantages have been overcome and as described earlier, separation of flocs and clarified water is facilitated even at a high velocity of flow.

One embodiment of the present invention will be more clearly described herinafter by way of examples with reference to the accompanying drawings, in which:

FIG. 1 is a sectional view of the water clarifying equipment illustrating a principle of the present invention;

FIG. 2 is a sectional view illustrating an example of water clarifying equipment embodying the present invention;

FIGS. 3, 4 and 5 are sectional views illustrating the application of the present invention on the conventional upflow type clarifiers.

The water clarifying equipment embodying the present invention is characterized by separating clarified water from flocs or sludge in two or more steps, more particularly, by separating clarified water in a fluidizing separator 1 (primary separation) from a sludge blanket 4 in a fluidized condition and leading it upward while the excess flocs thus separated are led to a concentrator 7 through a floc settling path 5, thereby allowing the flocs to settle down (secondary separation) into a concentrator 7. The separated clarified water in said concentrator 7 is then allowed to pass upwardly through a clarified water rising path 9 to join the clarified water which has been separated from a sludge blanket 4.

In this invention, flocs flow into a floc settling path 5 horizontally as though they are drawn into said path 5. Actually, the flocs grown larger by coagulation in a sludge blanket are separated from the clarified water in fluidized conditions. However, carryover of flocs takes place when the upward flow within the sludge blanket 4 is increased, or when concentration of the sludge blanket 4 becomes greater, but since the inside of said floc settling path 5 and the top of said concentrator 7 are filled with clarified water, the blanket flocs that came up to the top of said floc settling path 5 will settle into a concentrator 7 by density difference as if they are drawn into a concentrator 7.

Further, since the floc settling path 5 and the concentrator 7 are separated from said fluidized separator 1, an almost static condition of water can be maintained, or rather a downward flow of flocs occurs due to a function of said clarified water rising path 9, facilitating settlement of the flocs.

Further, the upward flow velocity in the fluidizing separator 1 suddenly reduces when it reaches the top of said floc settling path 5 due to an increase of sectional area occupied by said floc settling path 5, and at the same time, a flow will take place towards the top of said floc settling path 5, which permits the flocs to readily settle down into said floc settling path 5, constantly maintaining a stable sludge blanket.

And further to avoid a counterflow of settling flocs with the resulting water which is replaced by settlement of flocs in said floc settling path 5, the clarified water rising path 9 is separately provided to guide the clarified water being replaced by floc settlement into a clarified water zone 6, thereby permitting flocs to settle smoothly. With the integrated functions mentioned above, constant and uniform sludge concentration at a sludge blanket 4 is maintained to permit excess flocs to reasonably and smoothly settle down. At the same time, the surface of the blanket is maintained at the top level of said floc settling path 5 without carryover of flocs, insuring a satisfactory turbidity removal under rapid upward flow conditions.

Since the water purifying equipment embodying the present invention functions advantageously as described above, the equipment is operable at a range of 10 to 50 meters per hour of separation velocity (primary separation) to separate flocs from clarified water in a level of said sludge blanket 4. Since excess flocs descend through said floc settling path 5 to the concentrator 7 where the sludge accumulates and cocentrates, and since the flocs and clarified water are positively separated, sludge with low water content is drained out continuously or periodically from the bottom of said concentrator 7.

As shown in FIGS. 1 and 2, raw water with suspended substances is introduced into the fludizing separator 1 from an inlet 2, and after passing through a distributor 3, raw water then goes up to the sludge blanket 4 and here clarified water is separated from flocs under a separation velocity of 10 to 50 meters per hour (primary separation). The flocs after coagulation in the sludge blanket 4 in the primary separation step, flow into floc settling path 5 over its top rim and then arrive at concentrator 7 where the secondary step separation takes place by concentration. The fluidizing separator 1 and concentrator 7 are divided by dividing plate 8, and the floc settling path 5 that connects said fluidizing separator 1 with said concentrator 7 has its bottom portion extended to a point between said dividing plate 8 and the bottom plate of said concentrator 7, in order to prevent intrusion of a part of flocs from said floc settling path 5 into said clarified water rising path 9.

The clarified water rising path 9 is provided through the dividing plate 8 of said concentrator 7, and the top of said clarified water rising path 9 is placed at a more elevated position than the surface of said sludge blanket 4 and the top of said floc settling path 5.

Clarified water, after primary separation has been accomplished in the sludge blanket zone 4, flows upward and joins with clarified water that has been recovered through the clarified water rising path 9 after secondary separation at the concentrator 7, and goes out of the equipment through an outlet 10. The sludge which accumulates at the bottom of the concentrator 7 is taken out from a blow-off 11. A sampling and drain pipe 12 is provided at the bottom of said fluidizing separator 1 mainly for cleaning the interior of the fluidizing separator 1.

As clearly noted from the above explanation of the construction and functions of the present invention, the features of this invention lie in rapid and efficient separation of clarified water from flocs in two steps by means of fluidized separation and concentration. In the fluidizing separator 1, flocs are separated from clarified water in a fluidized state, and in the concentrator 7 partitioned by the dividing plate 8, flocs are separated from clarified water by settlement and concentration.

A tertiary separation step may be optionally provided, as it is easily accomplished by providing another concentractor below said concentrator 7 and installing another settling path through the bottom plate of said concentrator 7, in order to permit further recovery of clarified water. However, actually since separation of flocs from clarified water is positively carried out in an efficient manner by the primary and secondary separation steps, no more concentrator (tertiary separation) is normally required. Naturally, there may be many variations of the embodiment according to the present invention, such as providing a fluidizing separator 1 of constant cross-section, or one having an enlarged portion in the upper or lower part thereof, or an equipment having a floc settling path 5, a clarified water rising path 9, and a floc concentrator 7 of different configuration. And further the construction and materials of the fluidizing separator 1, the floc settling path 5 and the clarified water rising path 9 are not limited to those as described hereinbefore. The water clarifying equipment embodying the present invention can be used as an essential part of the separating system in the conventional upward flow type clarifiers of any construction, and this equipment can be made in various types such as open type, closed type, atmospheric pressure type or pressure type. For instance, FIG. 3 shows a closed type global clarifier which is provided with a concentrator 7 located by dividing a lower part of the separator, a floc settling path 5 adapted to open at an equator portion where an upward flow velocity becomes a minimum, and a clarified water rising path 9 extending up to a clarified water zone.

FIG. 4 shows a sludge circulation type clarifier which is provided with a concentrator 7 located by dividing a lower part of the separator, a floc settling path 5 connected thereto and extending up to a middle portion of the separator, and a clarified water rising path 9 extending to the upper part of said separator.

FIG. 5 shows a sludge blanket type clarifier provided with a concentrator 7, a floc settling path 5, and a clarified water rising path 9 in similar manner.

As described hereinabove, a steady sludge blanket can be maintained by applying a means according to the present invention even when an uprising velocity is increased several times that of the conventional means, thus assuring a treated water of good quality all the time. Also, sludge which is removed from the concentartor is highly concentrated, and it is possible to double the function of the present device.

Furthermore, in order to increase the capacity of the equipment to a larger size, the sectional area or number of floc settling paths 5, and clarified water rising paths 9, may be increased.

Although water treated by the present equipment can be used as treated for many purposes, it is preferably used for preliminary purification for other treatment in some water treating scheme. And also the equipment according to the present invention can be widely used for treating saline or brackish water or various waste water.

Some examples of the turbidity of water treated by the present equipment are given as follows:

(1)

| | | | | |
|---|---|---|---|---|
| Flow velocity (separation velocity), m./hr | 20 | 20 | 20 | 20 |
| Raw water turbidity, p.p.m | 20 | 50 | 100 | 200 |
| Clarified water turbidity, p.p.m | 3 | 4 | 3 | 3 |

(2)

| | | | | |
|---|---|---|---|---|
| Flow velocity (separation velocity), m./hr | 30 | 30 | 30 | 30 |
| Raw water turbidity, p.p.m | 20 | 50 | 100 | 200 |
| Clarified water turbidity, p.p.m | 5 | 6 | 4 | 4 |

(3)

| | | | | |
|---|---|---|---|---|
| Flow velocity (separation velocity), m./hr | 50 | 50 | 50 | 50 |
| Raw water turbidity, p.p.m | 20 | 50 | 100 | 200 |
| Clarified water turbidity, p.p.m | 6 | 7 | 6 | 6 |

Turbidity defined by JIS standard has been used hereinabove and its numerals are given in parts per million unit.

What is claimed is:

1. Water clarifying apparatus comprising a fluidizing separator compartment for separating a sediment-containing water into a sediment blanket and clarified water, said compartment having an inlet in a lower portion thereof for said sediment-containing water and an outlet near the top for said clarified water; a concentrator compartment for gravity separation of clarified water and collected sediment, said concentrator compartment being separated from and located below said separator compartment and having an outlet near the bottom for the collected sediment; a first conduit means connecting said separator compartment with said concentrator compartment, said first conduit means defining an overflow weir at substantially the top level of said sediment blanket and communicating with the clarified water within said separator compartment, said first conduit means extending into the clarified water in said concentrator compartment and terminating above the separated sediment in said concentrator compartment; and a second conduit means leading from the upper portion of said concentrator compartment to the clarified water in said separator compartment to induce a flow of water and sediment through the first conduit means to said concentrator compartment, and a flow of water clarified in said concentrator compartment to the clarified water in said separator compartment, whereby an upward current of clarified water is established above the level of said weir and accumulated sediment passes over said weir for collection at the bottom of said concentrator compartment.

2. A method of clarifying water comprising the steps of coagulating flocs in a fluidized condition in a fluidizing separator to form a sludge blanket in said separator; separating clarified water from said sludge blanket; discharging the clarified water from said separator through an outlet means in said separator; directing a portion of said sludge blanket from said fluidizing separator downwardly through first conduit means into a concentrator compartment provided with a sludge outlet means; separating flocs from water by means of gravity to form clarified water in said concentrator compartment, said portion of said sludge blanket being directed into the clarified water and above the separated flocs in said concentrator compartment; and discharging said clarified water from said concentrator compartment through a second conduit means, and, together with the clarified water from said fluidizing separator, through the outlet means in said separator; the downward flow in said first conduit means being caused by a difference of density between said sludge blanket and the water in the upper portion of said concentrator and by said flow through the second conduit means.

References Cited by the Examiner

UNITED STATES PATENTS

| | | | |
|---|---|---|---|
| 2,213,808 | 9/1940 | Von Stietz | 210—20 |
| 2,233,641 | 3/1941 | Ramsey | 210—261 X |
| 2,245,583 | 6/1941 | Green | 210—20 |
| 2,378,799 | 6/1945 | Sebald | 210—20 X |
| 2,889,929 | 6/1959 | Kivell | 210—261 X |

FOREIGN PATENTS 1,092,339  11/1960  Germany.

REUBEN FRIEDMAN, *Primary Examiner.*

D. M. RIESS, *Assistant Examiner.*